US008656426B2

(12) United States Patent
Leigh et al.

(10) Patent No.: US 8,656,426 B2
(45) Date of Patent: Feb. 18, 2014

(54) ADVERTISEMENT SELECTION (75) Inventors: Tony Leigh, London (GB); Martin Ahmed, Alton (GB); Christopher Martin, Eastleigh (GB); Ian R. Shelton, Ringwood (GB); James Wilson, Sturminster Newton (GB); Simon Dyke, Southampton (GB); Trevor Whinmill, Southampton (GB); Matt Spencer, Chandlers Ford (GB)

(73) Assignee: Cisco Technology Inc., San Jose, CA (US)

( * ) Notice: Subject to any disclaimer, the term of this patent is extended or adjusted under 35 U.S.C. 154(b) by 0 days.

(21) Appl. No.: 13/138,984

(22) PCT Filed: Apr. 12, 2010

(86) PCT No.: PCT/IB2010/051544
§ 371 (c)(1),
(2), (4) Date: Nov. 28, 2011

(87) PCT Pub. No.: WO2011/027231
PCT Pub. Date: Mar. 10, 2011

(65) Prior Publication Data
US 2012/0072282 A1    Mar. 22, 2012

(30) Foreign Application Priority Data

Sep. 2, 2009    (GB) .................................. 0915245.5

(51) Int. Cl.
*H04N 7/10* (2006.01)
(52) U.S. Cl.
USPC .............. 725/34; 705/14.49; 725/32; 725/35; 725/46

(58) Field of Classification Search
USPC ............................. 705/14.49; 725/32, 34, 46
See application file for complete search history.

(56) References Cited

U.S. PATENT DOCUMENTS

| 5,799,279 | A  | 8/1998 | Gould et al. |
| 5,822,730 | A  | 10/1998 | Roth et al. |
| 6,240,411 | B1 | 5/2001 | Thearling |
| 6,549,521 | B1 | 4/2003 | Edwards et al. |
| 6,717,950 | B2 | 4/2004 | Lui et al. |

(Continued)

FOREIGN PATENT DOCUMENTS

| EP | 2 048 613 A1 | 4/2009 |
| WO | WO 01/52541 A1 | 7/2001 |

OTHER PUBLICATIONS

Transmittal of International Search Report and Written Opinion of International Searching Authority for PCT/IB2010/051544.

(Continued)

*Primary Examiner* — Jonathan G Sterrett
*Assistant Examiner* — Stephen S Swartz
(74) *Attorney, Agent, or Firm* — Husch Blackwell LLP (57) ABSTRACT An end-user rendering system including an advertisement database to receive advertisements, and store the advertisements therein, a state database to store information, a decision model optimization module to receive a tree-type decision model and optimize the tree-type decision model based on at least some of the information stored in the state database, an advertisement decision module to evaluate the optimized tree-type decision model and select an advertising campaign, the selected advertising campaign having at least one advertisement, and a rendering module to render the at least one advertisement of the selected advertising campaign. Related apparatus and methods are also described.

6 Claims, 6 Drawing Sheets

(56) References Cited

U.S. PATENT DOCUMENTS

| | | |
|---|---|---|
| 6,727,914 B1 | 4/2004 | Gutta |
| 6,895,387 B1 * | 5/2005 | Roberts et al. ............. 705/14.47 |
| 7,092,452 B2 | 8/2006 | Taylor et al. |
| 7,246,102 B2 | 7/2007 | McDaniel et al. |
| 7,340,760 B2 | 3/2008 | Wachtfogel et al. |
| 7,389,497 B1 | 6/2008 | Edmark et al. |
| 7,574,411 B2 | 8/2009 | Suontausta et al. |
| 2002/0062299 A1 | 5/2002 | Matsukura et al. |
| 2002/0090198 A1 | 7/2002 | Rosenberg et al. |
| 2003/0139963 A1 * | 7/2003 | Chickering et al. ............. 705/10 |
| 2003/0154128 A1 * | 8/2003 | Liga et al. ....................... 705/14 |
| 2004/0044569 A1 | 3/2004 | Roberts et al. |
| 2004/0056087 A1 | 3/2004 | Bonneau, Jr. et al. |
| 2005/0246432 A1 | 11/2005 | Iijima et al. |
| 2006/0036497 A1 | 2/2006 | Chickering et al. |
| 2006/0242180 A1 * | 10/2006 | Graf et al. ..................... 707/101 |
| 2006/0288362 A1 | 12/2006 | Pulton, Jr. et al. |
| 2006/0293955 A1 * | 12/2006 | Wilson et al. ................... 705/14 |
| 2007/0011700 A1 | 1/2007 | Johnson |
| 2007/0078849 A1 | 4/2007 | Slothouber |
| 2008/0052219 A1 | 2/2008 | Sandholm et al. |
| 2008/0060000 A1 | 3/2008 | Drouet et al. |
| 2008/0082959 A1 * | 4/2008 | Fowler ........................ 717/104 |
| 2008/0091526 A1 * | 4/2008 | Shoemaker ...................... 705/14 |
| 2008/0191934 A1 | 8/2008 | Baker et al. |
| 2008/0208544 A1 * | 8/2008 | Buendia et al. ................... 703/2 |
| 2008/0263591 A1 | 10/2008 | de Heer |
| 2008/0288889 A1 * | 11/2008 | Hunt et al. ..................... 715/810 |
| 2008/0294584 A1 | 11/2008 | Herz |
| 2009/0048907 A1 * | 2/2009 | Lieberman ...................... 705/10 |
| 2009/0124241 A1 | 5/2009 | Krishnaswamy et al. |
| 2009/0199107 A1 | 8/2009 | Lewis et al. |
| 2009/0210901 A1 | 8/2009 | Hawkins et al. |
| 2009/0327317 A1 | 12/2009 | Ulmer et al. |
| 2010/0082627 A1 * | 4/2010 | Lai et al. ....................... 707/738 |
| 2011/0258049 A1 * | 10/2011 | Ramer et al. ................ 705/14.66 |
| 2012/0323674 A1 * | 12/2012 | Simmons et al. ........... 705/14.41 |
| 2013/0219427 A1 * | 8/2013 | Zundel et al. .................... 725/32 |

OTHER PUBLICATIONS

A. Falahati et al., "Dynamic Tree Pruning Method For Fast ACELP Search" (Iran University of Science and Technology).

Bill McNulty, "Decision Tree Media Strengthens Management Team With Experienced Executive And Prepares You For Growth" (Decision Tree Media, Inc., Jan. 29, 2008).

William E. Spangler et al., "Using Data Mining to Profile TV Viewers," Communications of the ACM (vol. 46. No. 12. pp. 67-72, Dec. 2003).

S.C. Wang et al., "Mobile Target Advertising by Combining Self-Organization Map and Decision Tree," Proceedings of The 2004 IEEE Conference on e-Technology, e-Commerce and e-Service (IEEE 2004).

Broadcast And On-Line Services: Search, Select, And Rightful Use Of Content On Personal Storage Systems ("TV-Anytime"); Part 3: Metadata; Sub-Part 4; Phase 2—Interstitial Metadata (ETSI TS 102 822-3-4-V1.2.1 (Mar. 2008). (European Telecommunications Standards Institute 2008).

Oct. 19, 2012 Office Communication in connection with prosecution of EP 10717254.6.

May 9, 2013 Office Communication in connection with prosecution of AU 2010 290905.

Aug. 2, 2013 Office Communication in connection with prosecution of AU 2010 290905.

* cited by examiner

ADVERTISEMENT SELECTION

FIELD OF THE INVENTION

The present invention relates to selecting an advertisement from a selection of advertisements.

BACKGROUND OF THE INVENTION

The following references are believed to represent the state of the art:
US Published Patent Application 2004/0056087 of Bonneau, JR., et al.;
US Published Patent Application 2007/0011700 of Johnson;
US Published Patent Application 2007/0078849 of Slothouber;
US Published Patent Application 2008/0191934 of Baker, et al.;
US Published Patent Application 2008/0263591 of de Heer;
PCT Published Patent Application WO 01/52541 of NDS Limited;
Article entitled "Using data mining to profile TV viewers" by William E. Spangler, Mordechai Gal-Or and Jerrold H. May, in Communications of the ACM, December 2003, Vol. 46, No. 12; and
Article entitled "Decision Tree Media" from www.DesignTaxi.com January 2008.

SUMMARY OF THE INVENTION

The present invention, in certain embodiments thereof, seeks to provide an improved advertisement selection system.

By way of introduction, TV Advertising business models are very flexible with the advertiser typically wishing to control everything about the placement of their advertisement(s). Some of the criteria an advertiser may specify for an advertising campaign include, but are not limited to: the desired target audience (e.g. by location or age or preferences); the number of impressions per day; the minimum spacing between impressions; the type of content that the advertisement may and may not be shown in; other advertisements that should not be placed near to the advertisement; the times of day the advertisement should be shown; and different versions of the advertisement to display in different conditions.

An advertiser may also specify the number of impressions that they wish to receive for a given target audience in a given timeframe and there may be penalties if the publisher is unable to meet the impressions in the given timeframe.

A single content publisher may have many advertising contracts to fulfill in any time period and many possible advertisements that could be shown at any given opportunity. Solving the problem of placing the available advertisements into the available opportunities in such a way as to maximize the revenue for the publisher is typically a computationally expensive operation.

Until now, the above problem has been solved either entirely at the publisher Headend or entirely, with limited scope, at an end-user device.

At the publisher Headend an advertisement decision system operates by examining the schedule of content and opportunities of a publisher and the expected target audience share for each opportunity. An opportunity is an opportunity to advertize, for example, but not limited to, during a commercial break in live or recorded TV or in an electronic program guide (EPG). The advertisement Decision System typically then optimizes the placement of advertisements within the opportunities respecting the restrictions of placement that the advertisers specify on the placement of their advertisements. The advertisements are then broadcasted to all clients as part of the broadcast stream. As the decision is made globally and without knowledge of any individual client, the placement decisions can only approximate the spacing between, and number of, impressions shown on any client. The advertisement decision system is also unable to change placement decisions when content has been recorded and is played back at a different time to the broadcast.

The concept of introducing a software component, or agent, within an end-user device to make advertising placement decisions is known, but suffers from several drawbacks. In particular, the problem is that as local storage in the client increases and as new inventory (such as EPG and Trick-play advertisements) requiring less storage space and creative effort becomes available, the number of advertisements that the client may have to choose from may be in the hundreds or even thousands. The number of advertisements becomes too great for a resource constrained device such as a set-top box (STB) and for the client agents therein. In addition, the complex and flexible business models which advertisers demand are generally too complex to implement entirely in an end-user device.

In accordance with an embodiment of the present invention, a global optimization is performed at the publisher Headend and a generally much simpler local optimization is performed in the end-user devices.

There is thus provided in accordance with an embodiment of the present invention, an end-user rendering system including an advertisement database to receive advertisements, and store the advertisements therein, a state database to store information including at least one of the following information about the end-user rendering system, information about a display device operationally connected to the end-user rendering system, information about a user of the end-user rendering system, a history of the advertisements previously rendered by the end-user rendering system, a decision model optimization module to receive a tree-type decision model, the tree-type decision model enabling selection of at least one advertising campaign from a plurality of advertising campaigns based on evaluating a collection of targeting criteria, each one of the advertising campaigns having at least one of the targeting criteria which must be fulfilled for the one advertising campaign to be selected, at least some of the advertising campaigns having at least one of the targeting criteria in common, the tree-type decision model including a plurality of paths emerging from a root node via a plurality of decision nodes terminating in a plurality of terminal nodes, the terminal nodes representing the advertising campaigns for selection and the decision nodes representing the targeting criteria so that for each one of the paths, the one path includes the at least one targeting criterion of the one advertising campaign terminating the one path, the at least some advertising campaigns having the at least one targeting criterion in common sharing at least one of the decision nodes, and optimize the tree-type decision model based on at least some of the information stored in the state database such that the paths having at least one of the decision nodes where the targeting criteria are not satisfied when evaluated with the at least some information are removed from the tree-type decision model, an advertisement decision module to evaluate each of the paths of the optimized tree-type decision model by evaluating the targeting criteria of at least one of the decision nodes in a direction from the root node to the terminal nodes, identify the paths where all the targeting criteria are satisfied in the evaluation of the paths, and select an advertising campaign from the advertising campaigns of the terminal nodes of the identified paths, the selected advertising campaign having at least one advertisement, and a rendering module to render the at least one advertisement of the selected advertising campaign.

Further in accordance with an embodiment of the present invention the at least some information evaluated by the decision model optimization module in order to yield the optimized tree-type decision model are static factors which do not change at least until a new tree-type decision model is received.

Still further in accordance with an embodiment of the present invention the decision model optimization module is operative to optimize the tree-type decision model for at least one of the advertising campaigns that has reached a maximum number of impressions by removing the paths including the at least one advertising campaign from the tree-type decision model.

Additionally in accordance with an embodiment of the present invention each of the paths has a priority-rating, and the advertisement decision module is operative to select the advertising campaign from a highest priority-rating path of the identified paths.

There is also provided in accordance with still another embodiment of the present invention a method including receiving advertisements, storing the advertisements, storing information including at least one of the following information about an end-user rendering system, information about a display device operationally connected to the end-user rendering system, information about a user of the end-user rendering system, a history of the advertisements previously rendered by the end-user rendering system, receiving a tree-type decision model, the tree-type decision model enabling selection of at least one advertising campaign from a plurality of advertising campaigns based on evaluating a collection of targeting criteria, each one of the advertising campaigns having at least one of the targeting criteria which must be fulfilled for the one advertising campaign to be selected, at least some of the advertising campaigns having at least one of the targeting criteria in common, the tree-type decision model including a plurality of paths emerging from a root node via a plurality of decision nodes terminating in a plurality of terminal nodes, the terminal nodes representing the advertising campaigns for selection and the decision nodes representing the targeting criteria so that for each one of the paths, the one path includes the at least one targeting criterion of the one advertising campaign terminating the one path, the at least some advertising campaigns having the at least one targeting criterion in common sharing at least one of the decision nodes, optimizing the tree-type decision model based on at least some of the stored information such that the paths having at least one of the decision nodes where the targeting criteria are not satisfied when evaluated with the at least some information are removed from the tree-type decision model, evaluating each of the paths of the optimized tree-type decision model by evaluating the targeting criteria of at least one of the decision nodes in a direction from the root node to the terminal nodes, identifying the paths where all the targeting criteria are satisfied in the evaluation of the paths, selecting an advertising campaign from the advertising campaigns of the terminal nodes of the identified paths, the selected advertising campaign having at least one advertisement, rendering the at least one advertisement of the selected advertising campaign.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

Persons skilled in the art will appreciate that, throughout the present application, a broadcast Headend is used by way of example only, and that the present invention is not limited to a particular type of information/content server but rather includes any suitable device.

Figure 1:
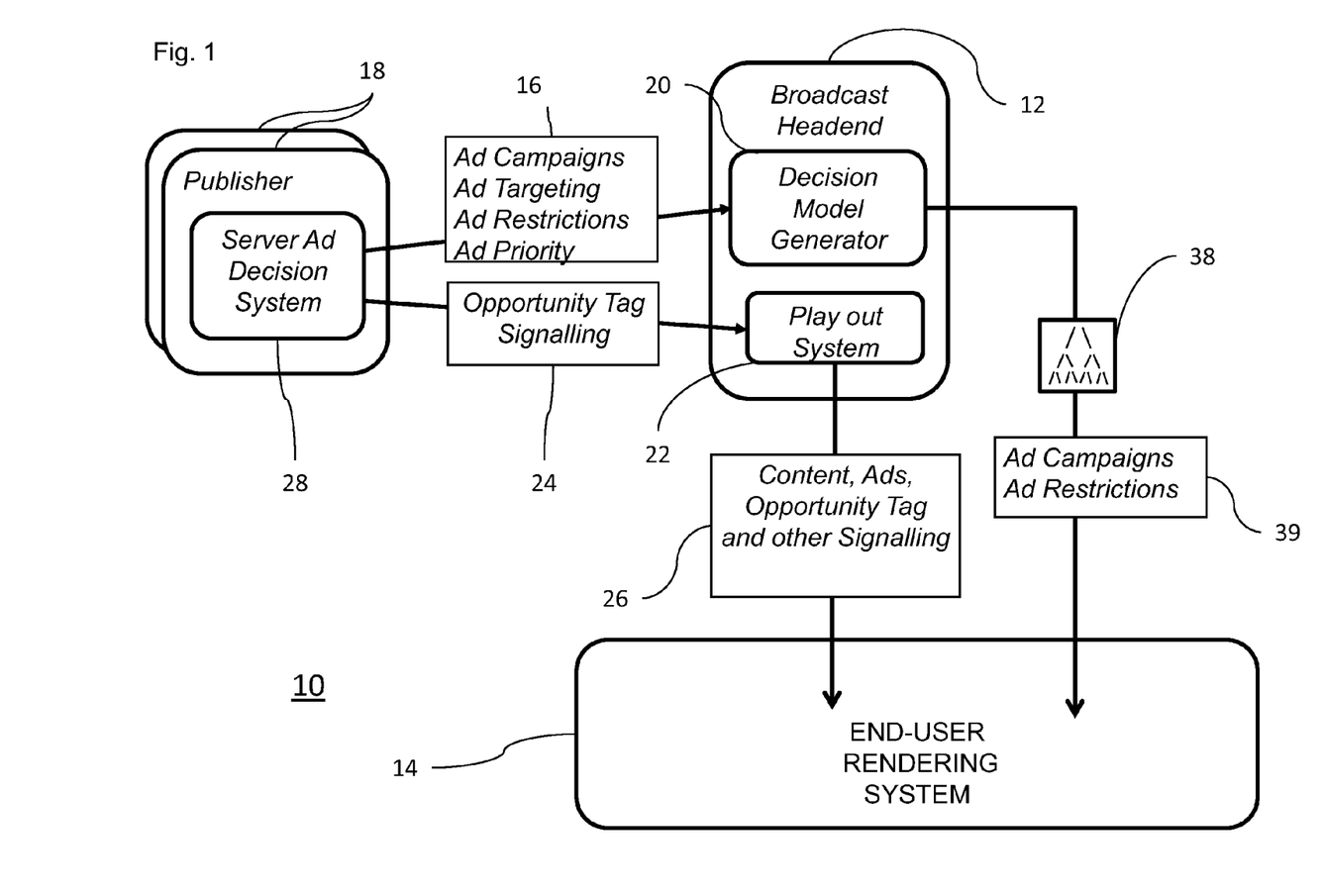
FIG. 1 is a partly pictorial, partly block diagram view of an advertisement selection system constructed and operative in accordance with an embodiment of the present invention.

Reference is now made to FIG. 1, which is a partly pictorial, partly block diagram view of an advertisement selection system 10 constructed and operative in accordance with an embodiment of the present invention.

The advertisement selection system 10 includes a broadcast Headend 12 and a plurality of end-user rendering systems 14 (only one shown for the sake of clarity). The end-user rendering systems 14 are also referred herein as the clients.

The broadcast Headend 12 includes a decision model generator 20 and a play-out system 22.

The decision model generator 20 and the play-out system 22 receive information from various publishers 18.

Each publisher 18 typically has a server advertisement decision system 28.

Each server advertisement decision system 28 is responsible for supplying details of the advertising campaigns, the targeting of the campaigns, the restrictions on the campaigns and the relative priority of each targeted campaign (block 16) to the decision model generator 20 of the broadcast Headend 12.

The play-out system 22 of the broadcast Headend 12 receives opportunity tag information 24 from the publishers 18. The opportunity tag information 24 is described in more detail with reference to FIG. 2.

The play-out system 22 prepares content, Ads and the opportunity tag information 24 and other signaling (block 26) for broadcast to the end-user rendering systems 14. The other signaling typically includes metadata associated with the content and the broadcast stream in general.

Figure 2:
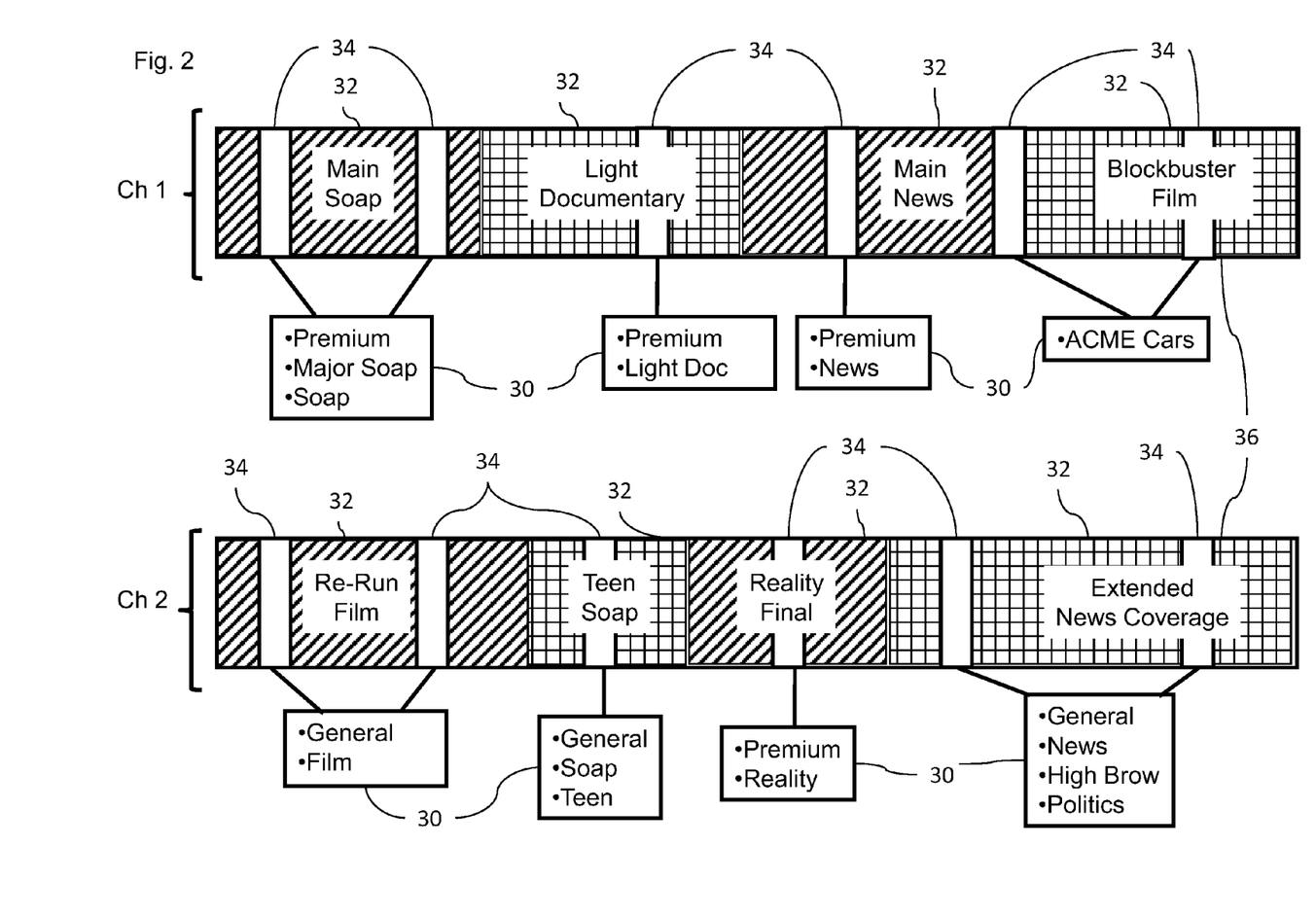
FIG. 2 is partly pictorial, partly block diagram view of opportunity tag signaling in the system of FIG. 1.

Reference is now made to FIG. 2, which is partly pictorial, partly block diagram view of signaling of opportunity tags 30 in the system 10 of FIG. 1. Reference is also made to FIG. 1.

FIG. 2 shows two channels, channel 1 and channel 2, and a plurality of programs 32 therein with a plurality of advertising opportunities 34.

The server advertisement decision system 28 is also responsible for signaling the advertisement opportunities 34 within a content stream 36 to the play-out system 22. The opportunity tag information 24 includes tags 30 that may be used by the advertisers to control the placement of Ads within specific sets of opportunities 34.

The opportunity tag 30 is a tag associated with one or more opportunities 34 that the publisher 18 makes available for advertising placement. The tag 30 is used to identify the type, or types, of opportunity 34 that a specific opportunity 34 represents in an advertising context. By associating the same tag 30 to multiple opportunities 34, the tag 30 groups opportunities 34 of the same type. By associating many different tags 30 to a single opportunity 34, the single opportunity 34 belongs to multiple groups. The tags 30 are generally used by the advertisers to select which opportunities 34 they wish the publisher 18 (FIG. 1) to consider placing the advertisements within.

There may be multiple and heterogeneous server advertisement decision systems 28 used by different publishers 18 who all publish content via the play-out system 22 of the broadcast Headend 12. A single server advertisement decision system 28 may control all of the advertising placed against the opportunity tags that the server advertisement decision system 28 uses. In other words, for a given opportunity 34, the opportunity tag(s) 30 may be from a single server advertisement decision system 28 and so only advertisements from the single server advertisement decision system 28 are considered for placement.

Reference is again made to FIG. 1.

The decision model generator 20 is generally responsible for aggregating all of the advertising campaigns, targeting criteria and priorities from multiple publishers into a logical tree-type decision model 38 that is ultimately interpreted by the end-user rendering systems 14 in order to place the correct advertisement in the correct opportunity 34 (FIG. 2) and context. The logical tree-type decision model 38 is globally optimized by the decision model generator 20. Each end-user rendering system 14 receives the tree-type decision model 38 and then locally optimizes the tree-type decision model 38 on receipt before being used.

The decision model generator 20 is now described in more detail.

The decision model generator 20 receives a set of advertising campaigns (block 16) from each server advertisement decision system 28. Each advertising campaign describes the restrictions on placement that the advertiser has specified and the particular advertisement copy to show in different conditions. An example of an advertising campaign with restrictions is shown in table 1.

TABLE 1

Advertising campaign Restrictions

ACME Deluxe

| This Campaign is of type | CAR, ACME |
|---|---|
| Max Impressions | 4 per day |
| Minimum Spacing | 1 hour |
| Do not show near Campaigns of type | CAR, ALCOHOL |
| Rotate between Advertisement Copy | Deluxe1, Deluxe2 |

The advertising campaigns and restrictions (block 39) are also broadcast to the end-user rendering systems 14 for use in the advertisement decision making, as will be described in more detail with reference to FIG. 6.

The decision model generator 20 also receives, from the server advertisement decision systems 28, at least one set of targeting criteria (block 16) for each advertising campaign. Each set of targeting instructions/criteria is associated with an opportunity tag 30 and is assigned a selection priority. Each set of targeting criteria describes the conditions that need to be satisfied for an advertising campaign to be selected. In other words, each advertising campaign may have different sets of targeting criteria for different opportunity tags with different priorities.

The targeting criteria refer to attributes of a state of the end-user rendering systems 14. Targeting criteria are described in more detail below with reference to FIG. 3.

The priority for a set of targeting criteria is typically the relative priority of selecting one campaign with a particular set of targeting criteria over all other campaigns managed by the server advertisement decision system 28. The calculation of the priority is outside of the scope of the advertisement selection system 10, but may include factors such as the cost per mille (CPM) rate of the campaign, the number of impressions required, the time left to run the campaign and penalty costs for missing the impression targets. The priorities and/or the targeting criteria are typically reviewed and amended on a periodic basis (typically daily) based on feedback from the end-user rendering systems 14 of actual advertisements viewed so that advertisers' viewing requirements may be fulfilled.

Table 2 shows an example of four advertising campaigns that are targeted into two different opportunity tags 30 (FIG. 2) with different targeting criteria and with different priorities. The opportunity tag "ACME Cars" is used for opportunities that ACME Cars have purchased exclusively and the "Premium Content" opportunity tag is used for opportunities in and around shows that the publisher 18 deems to be premium. The targeting refers to two attributes on the client; "RICH" is explicitly set to indicate that the household is a rich/wealthy household, and "Motoring Fan" may be either explicitly set, or determined dynamically by the end-user rendering systems 14. The targeting also refers to three attributes that are transient within the end-user rendering systems 14, namely: "First in Ad Break" refers to an opportunity occurring first within an advertisement break of a content item; "Motoring Content" refers to the opportunity occurring within Motoring Content; and "watched finance today" refers to having watched content described as "finance" during the same day that an opportunity is encountered.

It should be noted that the opportunity tags 30 may be viewed as specialized targeting criteria relating to a particular aspect of an opportunity. For example, a set of targeting criteria may include a criterion that an opportunity has a tag of "ACME CARS".

TABLE 2

Advertising campaign tags, targeting and priority

| Advertising campaign | Opportunity Tag | Targeting | Priority |
|---|---|---|---|
| Deluxe | ACME Cars | Rich & First Ad in Break | 20 |
| Deluxe | ACME Cars | Rich | 10 |
| Deluxe | Premium Content | Rich | 30 |
| Deluxe | Premium Content | Motoring Fan | 30 |
| Deluxe | Premium Content | Motoring Fan, Motoring Content | 40 |
| Deluxe | Premium Content | Motoring Fan, Motoring Content, First Ad in Break | 70 |
| Roger Tyres | Premium Content | Rich | 50 |
| Roger Tyres | Premium Content | Motoring Fan | 50 |
| Compact | ACME Cars | None | 10 |
| First Bank | Premium Content | Rich | 60 |
| First Bank | Premium Content | Rich and watched finance today | 90 |

The first optimization step the Decision Tree Generator takes is to turn the targeting instructions of Table 2 into the tree-type decision model 38 that can be used to locate the correct advertisement campaign to show for a given opportunity and context.

Figure 3:
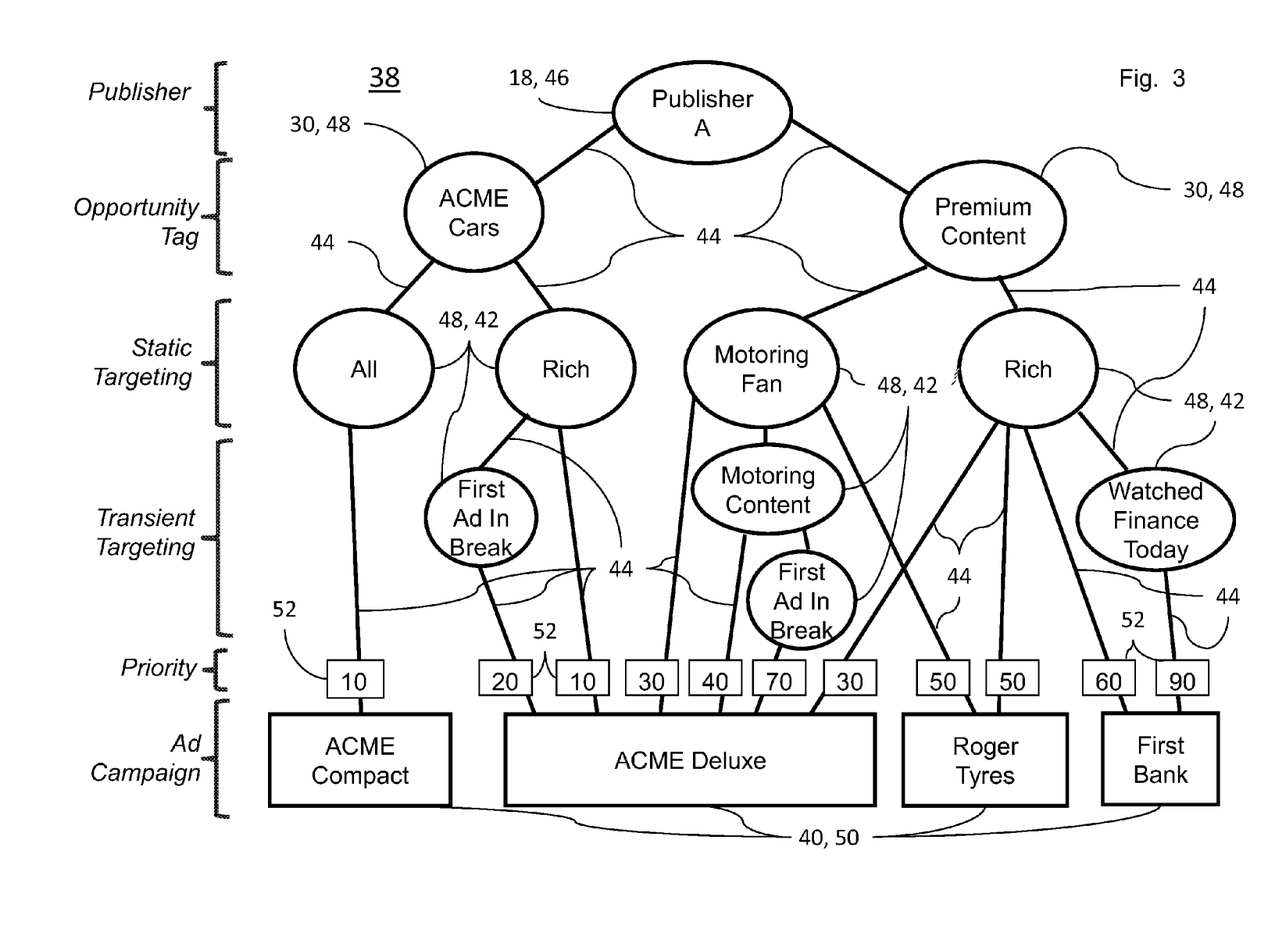
FIG. 3 is a partly pictorial, partly block diagram view of a tree-type decision model for use in the system of FIG. 1.

Reference is now made to FIG. 3, which is a partly pictorial, partly block diagram view of the tree-type decision model 38 for use in the system of FIG. 1.

The tree-type decision model 38 enables selection of at least one advertising campaign 40 from a plurality of advertising campaigns 40 based on evaluating a collection of targeting criteria 42 and the opportunity tags 30. As described above with reference to FIG. 1, each advertising campaign 40 has at least one of the targeting criteria 42 which must be fulfilled for the advertising campaign to be selected. Additionally, at least some of the advertising campaigns 40 have at least one targeting criterion 42 in common. For example, "motoring fan" is common to the "ACME Deluxe" campaign and the "Roger Tyres" campaign.

The tree-type decision model 38 includes a plurality of paths 44 emerging from a root node 46 via a plurality of decision nodes 48 terminating in a plurality of terminal nodes 50. The root node 46 represents the publisher 18. The terminal nodes 50 represent the advertising campaigns 40 for selection. The decision nodes represent the targeting criteria 42 and the opportunity tags 30. Therefore, each path 44 includes the targeting criteria 42 and the opportunity tag 30 of the advertising campaign 40 terminating the path 44.

Each of the paths 44 has a priority-rating 52 (only some of the priority-ratings 52 have been labeled for the sake of clarity).

To find the correct advertising campaign 40 to display, the end-user rendering system 14 (FIG. 1) must evaluate the tree-type decision model 38 considering all the decision nodes 48 that match the advertising opportunity 34 (FIG. 2) being considered, the context and the client state. Any advertising campaign 40 that is found during the evaluation can be considered for display. Evaluation of the tree-type decision model 38 is described in more detail with reference to FIGS. 5 and 6.

By using a tree-type model to hold the targeting criteria 42, the end-user rendering system 14 operating on the tree-type decision model 38 can quickly avoid considering large parts of the tree-type decision model 38 that are not applicable to the current opportunity 34, context and state. For example, if the opportunity tags 30 do not include "ACME Cars" then some of the left hand side of the tree-type decision model 38 can be discounted.

Additionally, in order to optimize the tree-type decision model 38, the advertising campaigns 40 having one or more targeting criteria 42 and/or an opportunity tag 30 in common may share one or more of the decision nodes 48. For example, the ACME Compact, Roger Tyres and First Bank advertising campaigns all target the "Rich" audience within the opportunity tag "Premium Content". Therefore, the work performed by the end-user rendering systems 14 is reduced as the evaluation of the viewer being in the "Rich" category occurs only once.

A further optimization utilized in the tree-type decision model 38 is to separate static targeting criteria 42 from the transient targeting criteria 42.

The static targeting criteria 42 refer to attributes that are not generally going to change from the clients' perspective for the lifetime of the tree-type decision model 38. For example, a client is designated as "Rich" for at least the lifetime of the tree-type decision model 38. The lifetime of the tree-type decision model 38, as used in the specification and claims, is defined herein as the length of time from receipt of the tree-type decision model 38 by the end-user rendering systems 14 until a new tree-type decision model 38 is received by the end-user rendering systems 14. Since advertising decisions change frequently, typically daily, and hence a new tree-type decision model 38 is delivered this is a reasonable assumption to make.

The transient targeting criteria 42 refer to attributes that are dynamic from the clients' perspective and may be true or false for different opportunities in different contexts. For example, the viewer may or may not have viewed content with a genre of "finance" today when an opportunity is presented.

Examples of static, or near-static targeting include, but are not limited to: location (e.g.: north, south); demographic (e.g.: rich, educated, employed, retired); family status (e.g.: married, kids, divorced, single); spending habits (e.g.: spends a certain amount weekly at the supermarket and e.g.: the kind of data that can be purchased from data mining agencies); subscription tier (e.g.: sports, movies, everything); watches lots of a certain type of content (e.g.: sports, movies, documentaries, news, finance); watches at certain times of day (e.g.: late home from work, stay at home mother, light viewer); age band (elderly, middle aged, young); and time of year/season (e.g.: summer, winter).

Examples of transient targeting include, but are not limited to: time of day, day of week (e.g.: weekday, weekend); type of content viewed (e.g.: genre, channel, series, episode); slot position (e.g.: first or last in commercial break, first break in show); slot occurrence (e.g.: first seen on this channel today, on channel change into channel); length of time watching TV (e.g.: just turned on, been watching for hours); recently watched content (e.g.: just watched the news/kids TV); type of viewing (e.g.: live, time-shifted, recorded, pull VOD, Push VOD; who is watching now; and how many people are watching now. The recently watched TV targeting may be useful when advertisers want to attempt to target an individual and not just anyone in the household.

Figure 4:
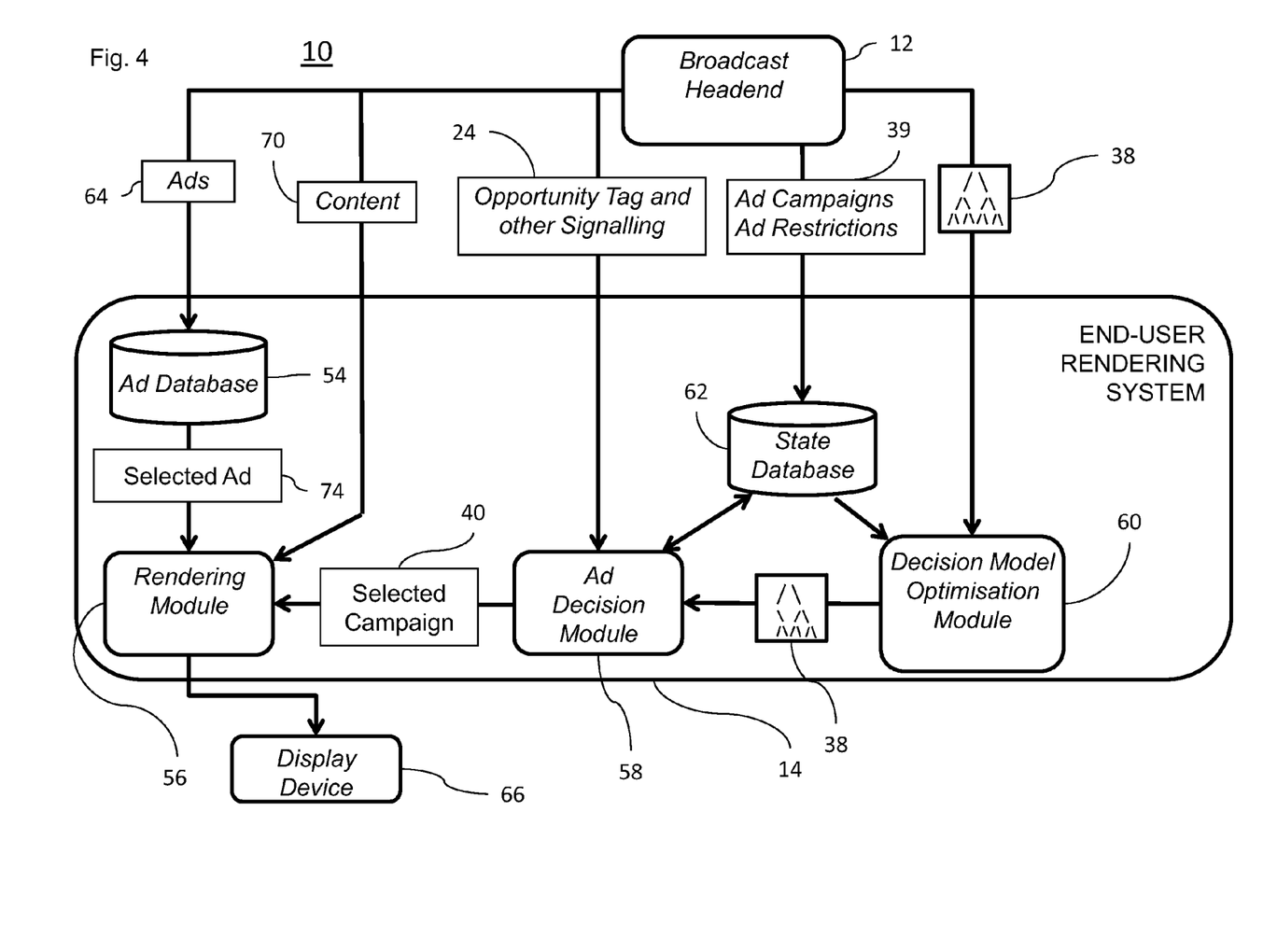
FIG. 4 is a more detailed view of an end-user rendering system in the advertisement selection system of FIG. 1.

Reference is now made to FIG. 4, which is a more detailed view of one of the end-user rendering systems 14 in the advertisement selection system 10 of FIG. 1.

The end-user rendering systems 14 may be selected from any suitable end-user rendering device, for example, but not limited to, an STB or a suitably configured computer and/or a mobile device such as a mobile telephone or television or PDA, for example only.

The end-user rendering system 14 typically includes an advertisement database 54, a rendering module 56, an advertisement decision module 58, a decision model optimization module 60 and a state database 62.

The advertisement database 54 is operative to: receive a plurality of advertisements 64 from the broadcast Headend 12; and store the advertisements 64 in the advertisement database 54.

The state database 62 is operative to store information including at least one of the following: information about the end-user rendering system 14 (e.g.: is the household rich); information about a display device 66 operationally connected to the end-user rendering system 14 (e.g.: is the display device HD or SD); information about a user of the end-user rendering system (e.g.: is the user a motoring fan); a history of the advertisements or content previously rendered by the end-user rendering system (e.g.: was finance watched today, when was the ACME Deluxe advertising campaign last displayed, how many times was the ACME Deluxe advertising campaign shown today). The state database 62 also receives the advertising campaign details and restrictions (block 39) from the broadcast Headend 12 for storing in the state database 62 so that the restrictions may be applied as required, for example, the maximum number of allowed impressions per day.

The decision model optimization module 60 is operative to receive the tree-type decision model 38 from the broadcast Headend 12 and optimize the tree-type decision model 38 as will be described in further detail with reference to FIGS. 5 and 6.

The advertisement decision module 58 is operative to select one of the advertising campaigns 40 based on evaluation of the optimized tree-type decision model 38 and data from the state database 62 as will be described in further detail with reference to FIGS. 5 and 6.

The rendering module 56 is operative to render received content 70 as well as the advertisements 64 as will be described in more detail with reference to FIG. 5.

Figure 5:
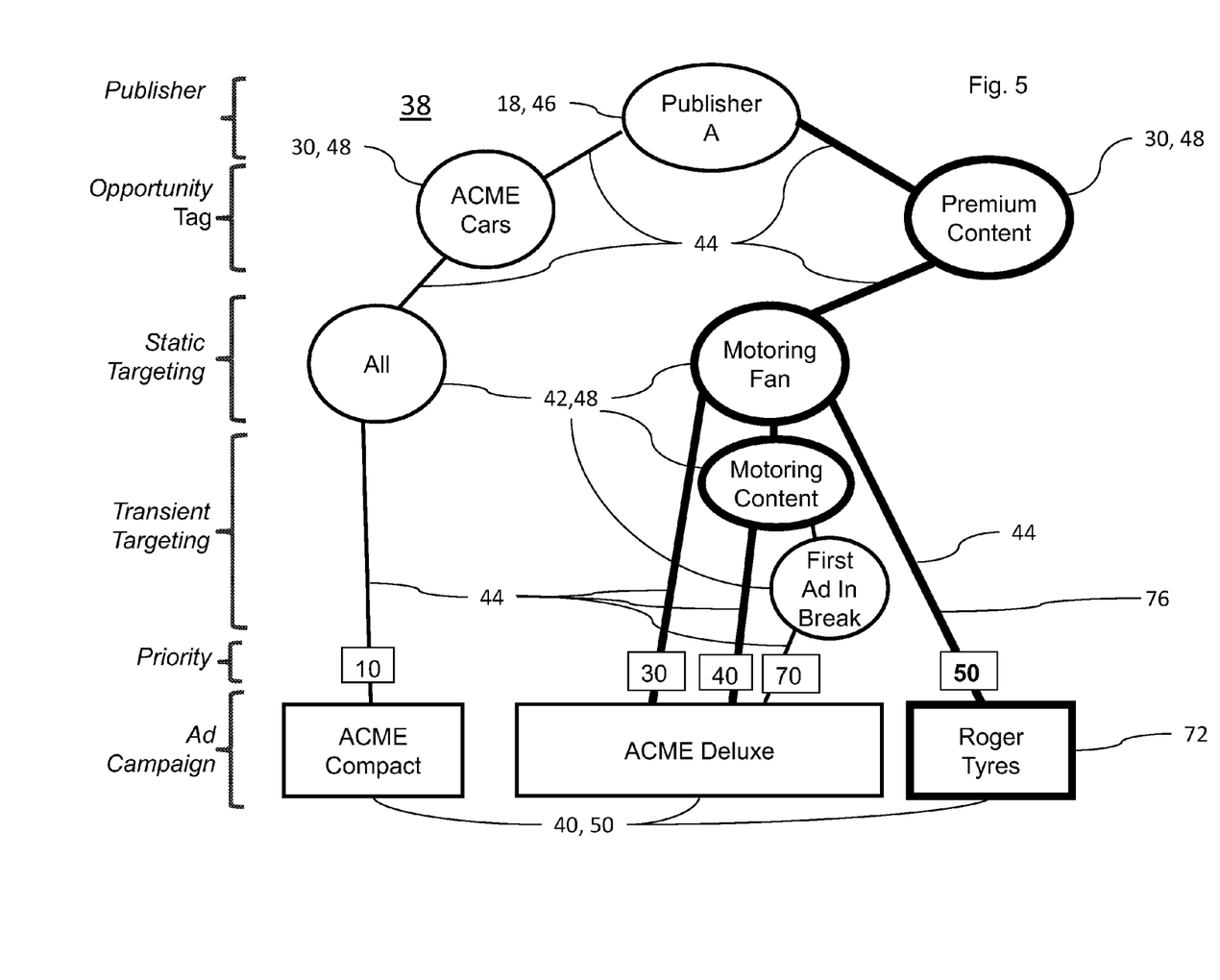
FIG. 5 is a partly pictorial, partly block diagram view of a first optimization of the tree-type decision model of FIG. 3.

Reference is now made to FIG. 5, which is a partly pictorial, partly block diagram view of a first optimization of the tree-type decision model 38 of FIG. 3. Reference is also made to FIG. 4.

By separating the static targeting criteria 42 from the transient targeting criteria 42 in the tree-type decision model 38 at the broadcast Headend 12, it is generally easier for the end-user rendering system 14 to pre-process and optimize the tree-type decision model 38 when the tree-type decision model 38 is acquired.

The decision model optimization module 60 is typically operative to optimize the tree-type decision model 38 based on particular information stored in the state database 62 such that the paths 44 having one or more decision nodes 48 where the targeting criteria 42 are not satisfied when evaluated with the particular information are removed from the tree-type decision model 38. Removing the paths 44 which are no longer relevant typically simplifies the tree-type decision model 38 and generally makes evaluation of the tree-type decision model 38 less computationally intensive.

It will be appreciated that the tree-type decision model 38 is not optimized for all the targeting criteria 42. Generally, the tree-type decision model 38 is optimized for the static targeting criteria 42 so that the particular information retrieved from the state database 62 and evaluated by the decision model optimization module 60 in order to yield the optimized tree-type decision model 38 are static factors which do not change at least until a new tree-type decision model 38 is received from the broadcast Headend 12. In other words, the static factors do not generally change for the lifetime of the current tree-type decision model 38 as described above with reference to FIG. 3.

FIG. 5 shows that the tree-type decision model 38 of FIG. 3 has been optimized based on static factors of the end-user rendering system 14 in question. The static factors indicate that at least one of the users of the end-user rendering system 14 is a "motoring fan" and the household of the end-user rendering system 14 is not classified as "Rich". Therefore, the optimized tree-type decision model 38 of FIG. 5 does not include any paths 44 including decision nodes 48 for the targeting criteria 42 of "Rich".

The tree-type decision model 38 may also be optimized for unavailable advertising campaigns described in more detail with reference to FIG. 6.

The above optimization step means that if one or more of the static targeting criteria 42 changes on the client (the end-user rendering system 14) then the tree-type decision model 38 will need to be regenerated for the change to take effect. The decision model optimization module 60 may regenerate the tree-type decision model 38 automatically or may wait for the next tree-type decision model 38 to become available from the broadcast Headend 12. The decision of whether the decision model optimization module 60 may regenerate the tree-type decision model 38 is typically controlled by the Broadcast Headend 12 which may choose to allow the publisher 18 to make the decision.

The lifetime of the tree-type decision model 38 is typically controlled by the server advertisement decision system 28 (FIG. 1). Typically, when the advertising campaigns, targeting, restrictions or priorities change then a new tree-type decision model 38 is generated and distributed to all the end-user rendering systems 14. Although the lifetime of any tree-type decision model 38 is typically controlled by the server advertisement decision system 28 (FIG. 1), a minimum propagation delay of the system 10 is enforced by the decision model generator 20 of the broadcast Headend 12 (FIG. 1). For example, the targeting may change many times within a few minutes, but the decision model generator 20 may generate a new tree only once an hour, for example, incorporating the latest information at the time. Alternatively the server advertisement decision system 28 may send all of the changes to the decision model generator 20, but hold the generation of a new tree-type decision model 38 until a trigger is sent from the server advertisement decision system 28 to the decision model generator 20.

Evaluation of the optimized tree-type decision model 38 is now described in more detail.

The advertisement decision module 58 is operative to evaluate each path 44 of the optimized tree-type decision model 38 by evaluating the targeting criteria 42 of at least one of the decision nodes 48 in a direction from the root node 46 to the terminal nodes 50 for a particular advertising opportunity. The reason all the decision nodes 48 may not need to be checked in the path 44 is that if during evaluation of each path 44, one decision node 48 in the path 44 is not satisfied then there is no need to continue checking down the rest of the path 44.

One of the differences between the tree-type decision model 38 and a "standard" decision tree is that evaluation of any decision node of a standard decision tree leads to continuing along only one path following the decision node which was evaluated, whereas in the tree-type decision model 38 the evaluation of one of the decision nodes 48 either leads to continuing along all the paths 44 below the decision node 48 if the evaluation of the decision node 44 is satisfied or none of the paths 44 if the decision node 48 is not satisfied. Additionally, a "standard" decision tree typically has at least two paths following each decision node whereas the tree-type decision model 38 may have one or more paths following each of the decision nodes 48. The term "is satisfied", as used in the specification and claims, is defined herein as, when the decision node 48 is evaluated the criterion of the node is fulfilled.

In the example of FIG. 5, the opportunity tag 30 of the particular advertising opportunity 34 (FIG. 2) under consideration is for "Premium Content". Therefore, the path 44 including "ACME Cars" is not considered any further.

The advertisement decision module 58 is then operative to identify the paths 44 where all the targeting criteria 42 are satisfied in the evaluation of the paths 44. The identified paths 44 terminate in possible advertising campaigns 40 for display. The identified advertising campaigns 40 are now considered.

In the example of FIG. 5, the particular advertising opportunity 34 is during "motoring content" and is the second advertisement in the break. Therefore, the path 44 including "first ad in Break" is not considered further. Therefore, the paths 44 with the thicker lines shown in FIG. 5 are identified as paths for further consideration.

The advertisement decision module 58 is operative to select an advertising campaign 72 from the advertising campaigns 40 represented by the terminal nodes 50 of the identified paths 44. Typically, the advertisement decision module 58 is operative to select the advertising campaign 72 from a highest priority-rating path 76 of the identified paths 44. The selected advertising campaign 72 may have one or more advertisements 74 for displaying.

In the example of FIG. 5, the advertising campaign 40 of "Roger Tyres" has the highest priority of '50' from the identified paths 44. Therefore, the advertising campaign 40 of "Roger Tyres" is selected for the current advertising opportunity 34.

The advertisement selection system 10 for selecting advertisements is not limited to selecting advertisements for showing within the main video stream content. The advertisement selection system 10 is also useful for selecting advertisements for other advertising opportunities, for example, but not limited to, within the electronic program guide (EPG), overlaying the video, trick modes, and channel change. Additionally or alternatively, the advertisement may be any suitable format, for example, but not limited to, a video format, a non-video format such as static or animated images or text.

The rendering module 56 is operative to render one of the advertisements 74 of the selected advertising campaign 72 on the display device 66.

Figure 6:
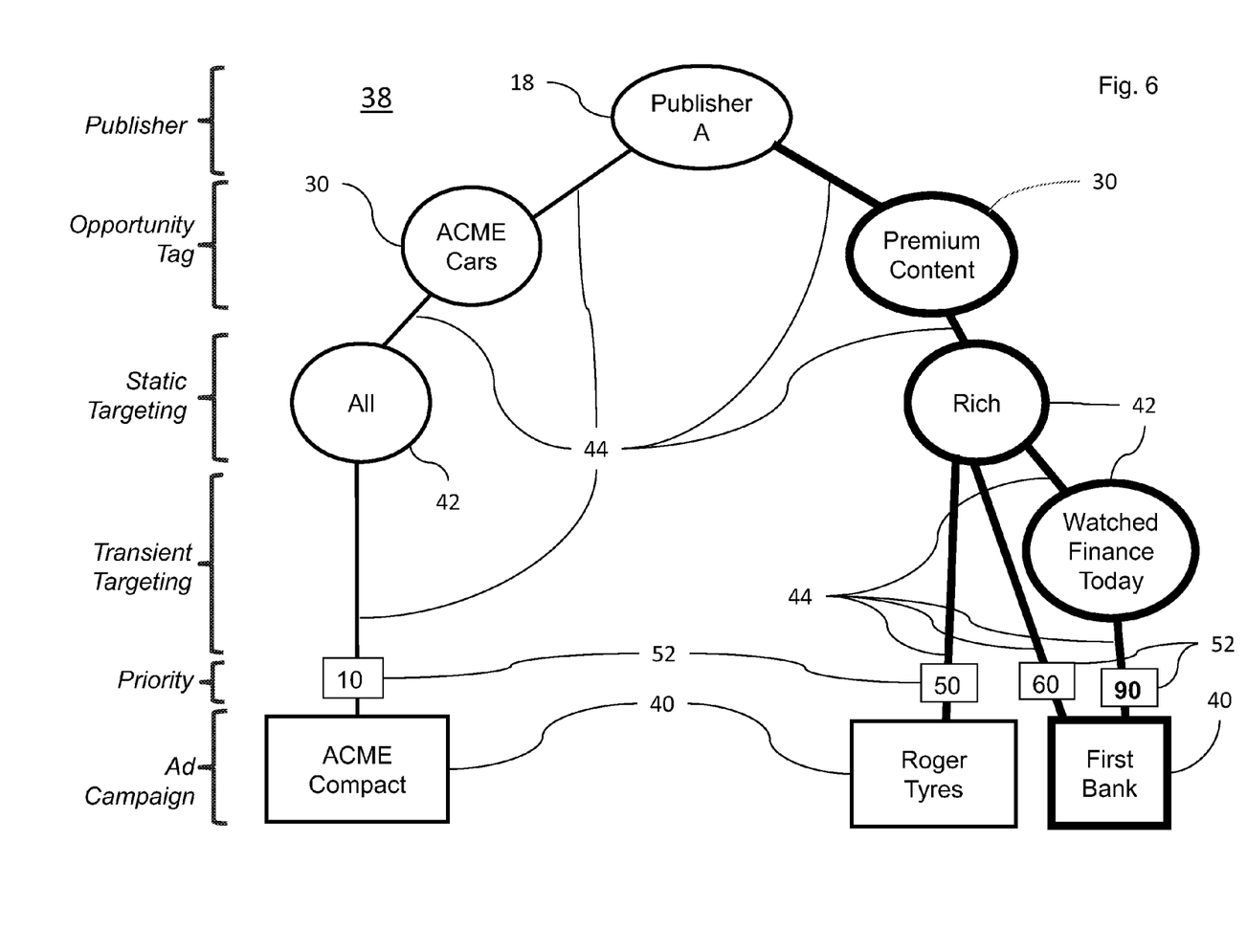
FIG. 6 is a partly pictorial, partly block diagram view of a second optimization of the tree-type decision model of FIG. 3.

Reference is now made to FIG. 6, which is a partly pictorial, partly block diagram view of a second optimization of the tree-type decision model 38 of FIG. 3. Reference is also made to FIG. 4.

A further optimization that the decision model optimization module 60 can perform is to remove any advertising campaign(s) 40 from the tree-type decision model 38 that are not for display. An advertising campaign 40 may not be able to be displayed because the advertising campaign 40 has not yet been acquired by the end-user rendering system 14 or because the advertising campaign 40 has already met the maximum number of impressions, by way of example only. The number of impressions of an advertising campaign 40 and the maximum number of allowed impressions are typically stored in the state database 62.

Therefore, the decision model optimization module 60 is typically operative to optimize the tree-type decision model 38 for one or more unavailable advertising campaigns 40 that have reached a maximum number of impressions, by removing the paths 44 including the unavailable advertising campaign(s) from the tree-type decision model 38.

FIG. 6 shows that the tree-type decision model 38 of FIG. 3 has been optimized based on removing an unavailable advertising campaign 40, namely the "ACME Deluxe" advertising campaign. Therefore, the optimized tree-type decision model 38 of FIG. 6 does not include any paths 44 terminating with the "ACME Deluxe" advertising campaign.

In the example of FIG. 6, the opportunity tag 30 of the particular advertising opportunity 34 (FIG. 2) under consideration is for "Premium Content". Therefore, the path 44 including "ACME Cars" is not considered any further.

In the example of FIG. 6, the user(s) of the end-user rendering system 14 have "watched finance today". Therefore, all the paths 44 under "premium content" are identified for further consideration. The advertising campaign 40 (namely, "First Bank") terminating the path 44 with the highest priority of '90' is therefore selected for display by the advertisement decision module 58.

It is appreciated that software components of the present invention may, if desired, be implemented in ROM (read only memory) form. The software components may, generally, be implemented in hardware, if desired, using conventional techniques. It is further appreciated that the software components may be instantiated, for example, as a computer program product; on a tangible medium; or as a signal interpretable by an appropriate computer.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described hereinabove. Rather the scope of the invention is defined by the appended claims and equivalents thereof.

What is claimed is:

1. An end-user rendering system in an environment comprising a broadcast Headend and a plurality of other end-user rendering systems, the broadcast Headend being operative to globally optimize a tree-type decision model and send the globally optimized tree-type decision model to the end-user rendering system and the other end-user rendering systems for local optimization, the end-user rendering system including computer processing machinery to:
  receive advertisements;
  store the advertisements in an advertisement database;
  store, in a state database, information including at least one of the following: information about the end-user rendering system, information about a display device operationally connected to the end-user rendering system, information about a user of the end-user rendering system, a history of the advertisements previously rendered by the end-user rendering system;
  receive the globally optimized tree-type decision model at the end-user rendering system from the broadcast Headend for local optimization at the end-user rendering system, the globally optimized tree-type decision model enabling selection of at least one advertising campaign from a plurality of advertising campaigns based on evaluating a collection of targeting criteria, each one of the advertising campaigns having at least one of the targeting criteria which must be fulfilled for the one advertising campaign to be selected, at least some of the advertising campaigns having at least one of the targeting criteria in common, the globally optimized tree-type decision model including a plurality of paths emerging from a root node via a plurality of decision nodes terminating in a plurality of terminal nodes, the terminal nodes representing the advertising campaigns for selection and the decision nodes representing the targeting criteria so that for each one of the paths, the one path includes the at least one targeting criterion of the one advertising campaign terminating the one path, the at least some advertising campaigns having the at least one targeting criterion in common sharing at least one of the decision nodes; and
  optimize the globally optimized tree-type decision model in the end-user rendering system, yielding a locally optimized tree-type decision model, based on at least some of the information stored in the state database such that the paths having at least one of the decision nodes where the targeting criteria are not satisfied when evaluated with the at least some information are removed from the globally optimized tree-type decision model;

evaluate each of the paths of the locally optimized tree-type decision model by evaluating the targeting criteria of at least one of the decision nodes in a direction from the root node to the terminal nodes;
identify the paths where all the targeting criteria are satisfied in the evaluation of the paths; and
select an advertising campaign from the advertising campaigns of the terminal nodes of the identified paths, the selected advertising campaign having at least one advertisement; and
render the at least one advertisement of the selected advertising campaign.

2. The system according to claim 1, wherein the at least some information evaluated in order to yield the locally optimized tree-type decision model are static factors which do not change at least until a new globally optimized tree-type decision model is received.

3. The system according to claim 1, wherein the computer processing machinery is operative to optimize the globally optimized tree-type decision model for at least one of the advertising campaigns that has reached a maximum number of impressions by removing the paths including the at least one advertising campaign from the globally optimized tree-type decision model.

4. The system according to claim 1, wherein:
each of the paths has a priority-rating; and
the computer processing machinery is operative to select the advertising campaign from a highest priority-rating path of the identified paths.

5. A method in an environment comprising a broadcast Headend, an end-user rendering system and a plurality of other end-user rendering systems, the broadcast Headend being operative to globally optimize a tree-type decision model and send the globally optimized tree-type decision model to the end-user rendering system and the other end-user rendering systems for local optimization, the method including the end-user rendering system performing the following steps with computer processing machinery:
receiving advertisements;
storing the advertisements in an advertisement database;
storing, in a state database, information including at least one of the following: information about the end-user rendering system, information about a display device operationally connected to the end-user rendering system, information about a user of the end-user rendering system, a history of the advertisements previously rendered by the end-user rendering system;
receiving the globally optimized tree-type decision model at the end-user rendering system from the broadcast Headend for local optimization at the end-user rendering system, the globally optimized tree-type decision model enabling selection of at least one advertising campaign from a plurality of advertising campaigns based on evaluating a collection of targeting criteria, each one of the advertising campaigns having at least one of the targeting criteria which must be fulfilled for the one advertising campaign to be selected, at least some of the advertising campaigns having at least one of the targeting criteria in common, the globally optimized tree-type decision model including a plurality of paths emerging from a root node via a plurality of decision nodes terminating in a plurality of terminal nodes, the terminal nodes representing the advertising campaigns for selection and the decision nodes representing the targeting criteria so that for each one of the paths, the one path includes the at least one targeting criterion of the one advertising campaign terminating the one path, the at least some advertising campaigns having the at least one targeting criterion in common sharing at least one of the decision nodes;
optimizing the globally optimized tree-type decision model in the end-user rendering system, yielding a locally optimized tree-type decision model, based on at least some of the stored information such that the paths having at least one of the decision nodes where the targeting criteria are not satisfied when evaluated with the at least some information are removed from the globally optimized tree-type decision model;
evaluating each of the paths of the locally optimized tree-type decision model by evaluating the targeting criteria of at least one of the decision nodes in a direction from the root node to the terminal nodes;
identifying the paths where all the targeting criteria are satisfied in the evaluation of the paths;
selecting an advertising campaign from the advertising campaigns of the terminal nodes of the identified paths, the selected advertising campaign having at least one advertisement; and
rendering the at least one advertisement of the selected advertising campaign.

6. A non-transient storage medium storing computer program code for controlling a computer to implement a method of rendering advertisements at an end user rendering system in an environment including a broadcast Headend, an end-user rendering system and a plurality of other end-user rendering systems, the broadcast Headend being operative to globally optimize a tree-type decision model and send the globally optimized tree-type decision model to the end-user rendering system and the other end-user rendering systems for local optimization, the code comprising:
code for controlling the computer to receive and store advertisements associated with advertising campaigns in an advertisement database;
code for controlling the computer to store, in a state database, information comprising at least one of: information about the end user rendering system, information about a display device operationally connected to the end user rendering system, information about a user of the end user rendering system, and a history of the advertisements previously rendered by the end user rendering system;
code for controlling the computer to receive the globally optimized tree-type decision model at the end-user rendering system from the broadcast Headend for local optimization at the end-user rendering system, the globally optimized tree-type decision model enabling selection of at least one advertising campaign from a plurality of advertising campaigns based on evaluating a collection of targeting criteria, each one of the advertising campaigns having at least one of the targeting criteria which must be fulfilled for the one advertising campaign to be selected, at least some of the advertising campaigns having at least one of the targeting criteria in common, the globally optimized tree type decision model including a plurality of paths emerging from a root node via a plurality of decision nodes terminating in a plurality of terminal nodes, the terminal nodes representing the advertising campaigns for selection and the decision nodes representing the target criteria so that for each one of the paths, the one path includes the at least one target criterion of the one advertising campaign terminating the one path, the at least some advertising campaigns having the at least one targeting criterion in common sharing at least one of the decision nodes;

code for controlling the computer to optimize the globally optimized tree type decision model in the end-user rendering system, yielding a locally optimized tree-type decision model, based on at least some of the stored state information such that the paths having at least one of the decision nodes where the targeting criteria are not satisfied when evaluated with the at least some information are removed from the globally optimized tree type decision model;

code for controlling the computer to receive opportunity tags, each opportunity tag identifying the location of advertising opportunities in streamed video from a remote broadcast system and providing information on advertising opportunities;

code for controlling the computer to evaluate each of the paths of the locally optimized tree type decision model using the received opportunity tags to evaluate the targeting criteria of at least one of the decision nodes in a direction from the root node to the terminal nodes;

code for controlling the computer to identify the paths where all the targeting criteria are satisfied in the evaluation of the paths;

code for controlling the computer to select an advertising campaign for each opportunity tag from the advertising campaigns of the terminal nodes of the identified paths and in dependence upon the advertising opportunity, the selected advertising campaign having at least one advertisement associated therewith;

code for controlling the computer to receive a video stream from a broadcast system; and code for controlling the computer to render the at least one advertisement of the selected advertising campaign for each opportunity tag at the location in the video stream identified in the respective opportunity tag for display to the user.

\* \* \* \* \*

UNITED STATES PATENT AND TRADEMARK OFFICE
CERTIFICATE OF CORRECTION

| | | Page 1 of 1 |
|---|---|---|
| PATENT NO. | : 8,656,426 B2 | |
| APPLICATION NO. | : 13/138984 | |
| DATED | : February 18, 2014 | |
| INVENTOR(S) | : Leigh et al. | |

It is certified that error appears in the above-identified patent and that said Letters Patent is hereby corrected as shown below:

In the Specifications

In column 1 immediately after the Title and before the heading "FIELD OF THE INVENTION," add:
--The present application is a 35 USC §371 submission of PCT/IB2010/051544, filed on 12 April 2010 and entitled "Advertisement Selection", which was published on 10 March 2011 in the English language with International Publication Number WO 2011/027231 and which relies for priority on Patent Application GB 0915245.5 filed 2 September 2009.--.

Signed and Sealed this
Twenty-second Day of April, 2014

Michelle K. Lee
*Deputy Director of the United States Patent and Trademark Office*